D. A. B. Savy,
Pencil.
No. 49,059.        Patented July 25, 1865.
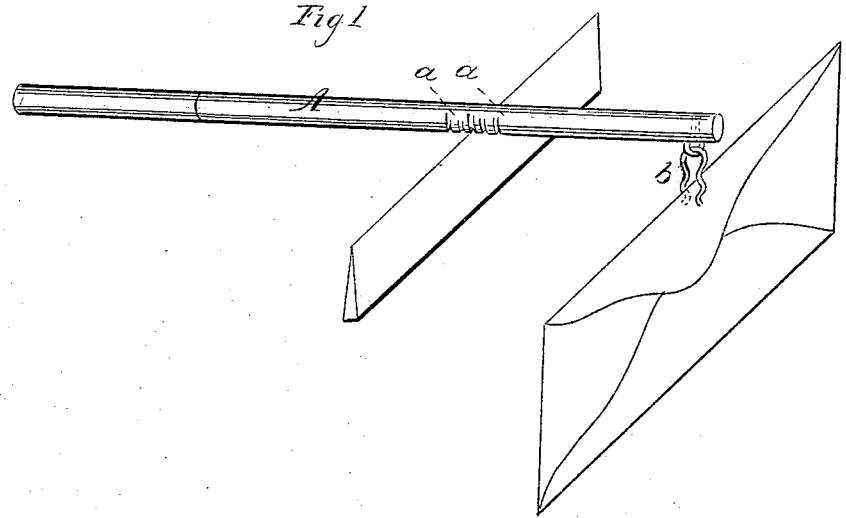
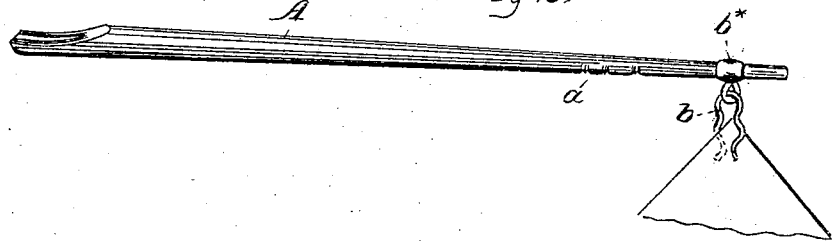
Witnesses:
C. L. Topliff
Theo Tusch
Inventor:
D. A. B. Savy
per Munn & Co
attorneys

UNITED STATES PATENT OFFICE.

D. A. B. SAVY, OF PARIS, ASSIGNOR TO E. T. VANDERBERGH, OF TOULON, FRANCE.

IMPROVED WEIGHING ATTACHMENT FOR PEN-HOLDERS OR PENCILS.

Specification forming part of Letters Patent No. 49,059, dated July 25, 1865.

*To all whom it may concern:*

Be it known that I, DÉSIRÉ ALPHONSE BENJAMIN SAVY, of Paris, in the Empire of France, have invented a new and Improved Weighing Attachment to Pen-Holders or Pencils; and I do hereby declare that the following is a full, clear, and exact description thereof, which will enable others skilled in the art to make and use the same, reference being had to the accompanying drawings, forming part of this specification, in which—

Figure 1 is a side elevation of my weighing attachment when used for weighing a letter. Fig. 2 is a modification of the same.

Similar letters of reference indicate like parts.

This invention consists in the application to a pen-holder or pencil of a clasp capable to hold a letter or other article to be weighed, in combination with one or more notches cut or otherwise produced in the surface of the holder or of the pencil, in such a position and in such a manner that by placing the pencil or pen-holder on the edge of a knife or other similar implement the weight of a letter or other article secured in the clasp can be readily determined in an expeditious and easy manner.

A represents a pen-holder or pencil of a cylindrical form or any other convenient shape. The surface of this pen-holder or pencil is provided with one or more notches, $a$, at a point nearer to its upper or outer than to its lower or inner end, and a clasp, $b$, is connected to the short end of the same, as clearly shown in the drawings. This clasp is so constructed that a letter or other article to be weighed can be readily secured thereon for the purpose of ascertaining its weight.

The clasp may either be stationary, as shown in Fig. 1, or it may be secured to a sleeve, $b^*$, which can be moved closer to or farther from the notches $a$. In the former case a series of notches is necessary in order to ascertain the weight of letters or other articles of different size or heft, and the several notches are adjusted in such a manner that when one of them is placed on the edge of a knife a given weight suspended from the clasp will balance the long end of the pen-holder or pencil. For instance, one notch corresponds to one-half ounce, the next to an ounce, and so forth, according to the rates of postage. If desired, however, one notch is sufficient, and in that case the sleeve to which the clasp is attached is made adjustable toward and from the notch, and suitable marks on the circumference of the pen-holder or pencil indicate the weight of the article suspended from the clasp.

During the operation of weighing, the pen has to be removed when a pen-holder is used. The pen-holder or pencil might also be provided with a ring to take the place of the knife-edge, and holding this ring in one hand and adjusting the holder or pencil in it, the weight of the article in the clasp can be ascertained.

I claim as new and desire to secure by Letters Patent—

A weighing attachment constructed substantially as described, and applied to a pen-holder or pencil, for the purposes set forth.

D. SAVY.

Witnesses:
E. SHERMAN GOULD,
C. CHROS,
A. GUION.